US012688686B1

(12) United States Patent
Burlina et al.

(10) Patent No.: US 12,688,686 B1
(45) Date of Patent: Jul. 21, 2026

(54) GENERATING PERCEPTION DATA USING A CRITIC NETWORK

(71) Applicant: Zoox, Inc., Foster City, CA (US)

(72) Inventors: Philippe Martin Burlina, Rockville, MD (US); Rajendramayavan Rajendran Sathyam, Foster City, CA (US); Lilian Volta, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 343 days.

(21) Appl. No.: 18/517,033

(22) Filed: Nov. 22, 2023

(51) Int. Cl.
| | |
|---|---|
| *G06V 10/82* | (2022.01) |
| *G06V 10/762* | (2022.01) |
| *G06V 10/764* | (2022.01) |
| *G06V 20/70* | (2022.01) |

(52) U.S. Cl.
CPC ............ *G06V 10/82* (2022.01); *G06V 10/762* (2022.01); *G06V 10/764* (2022.01); *G06V 20/70* (2022.01)

(58) Field of Classification Search
CPC .... G06V 10/82; G06V 10/762; G06V 10/764; G06V 20/70
See application file for complete search history.

(56) References Cited

U.S. PATENT DOCUMENTS

| | | | |
|---|---|---|---|
| 2024/0153259 A1* | 5/2024 | Motiian | G06V 10/751 |
| 2024/0185035 A1* | 6/2024 | Yu | G06N 3/0455 |
| 2024/0320789 A1* | 9/2024 | Hinz | G06T 11/00 |
| 2024/0320872 A1* | 9/2024 | Hinz | G06F 40/40 |
| 2024/0320873 A1* | 9/2024 | Hinz | G06T 11/00 |
| 2025/0095338 A1* | 3/2025 | Li | G06V 10/774 |
| 2025/0308083 A1* | 10/2025 | Kelkar | G06T 11/00 |

OTHER PUBLICATIONS

Lei, Shiye, et al. "Image captions are natural prompts for text-to-image models." arXiv preprint arXiv:2307.08526 (2023). (Year: 2023).*

* cited by examiner

*Primary Examiner* — Utpal D Shah
(74) *Attorney, Agent, or Firm* — Lee & Hayes, P.C.

(57) ABSTRACT

Techniques for improving synthetic training data generation by models used to generate training data for training object detection models are disclosed. Synthetic data may be generated by a synthetic training data generation model and provided to a crit model. The critic network may determine, based on real-world data associated with similar scenarios represented by the generated synthetic data, whether the generated synthetic data is distinguishable from real-world data. If so, the system may adjust the parameters of the synthetic training data generation model and again execute the model to generate synthetic data. This subsequent synthetic data is then critiqued by the critic network. This process may be iteratively performed until the synthetic data generated by the synthetic training data generation model is indistinguishable from real-world data. The synthetic training data generation model may then be used to generate data that may be used to train other models.

20 Claims, 5 Drawing Sheets

GENERATING PERCEPTION DATA USING A CRITIC NETWORK

BACKGROUND

Various systems and techniques are utilized to perform detection of objects, such as vehicles, pedestrians, and bicycles, in an environment. For example, autonomous vehicles may be configured with various types of sensor systems that collect data in environments. Such sensor systems may include vision systems, lidar systems, radar systems, sonar systems, and the like. Various properties of data captured in an environment by such systems can be used to generate further data representing the presence and various characteristics of objects in the environment. Object characteristics and other aspects detected in an environment may be used to determine the location of an autonomous vehicle and/or objects in the environment, for example, for purposes of controlling the vehicle as it traverses the environment. However, some objects and/or their associated characteristics may be difficult to accurately identify and/or classify and may therefore present challenges to navigating a vehicle safely through an environment. Obtaining training data including unusual scenarios with infrequently occurring objects and/or characteristic may be challenging due to the rarity of occurrence of such scenarios in the real-world. This increases the difficulty of training models to accurately detect such scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
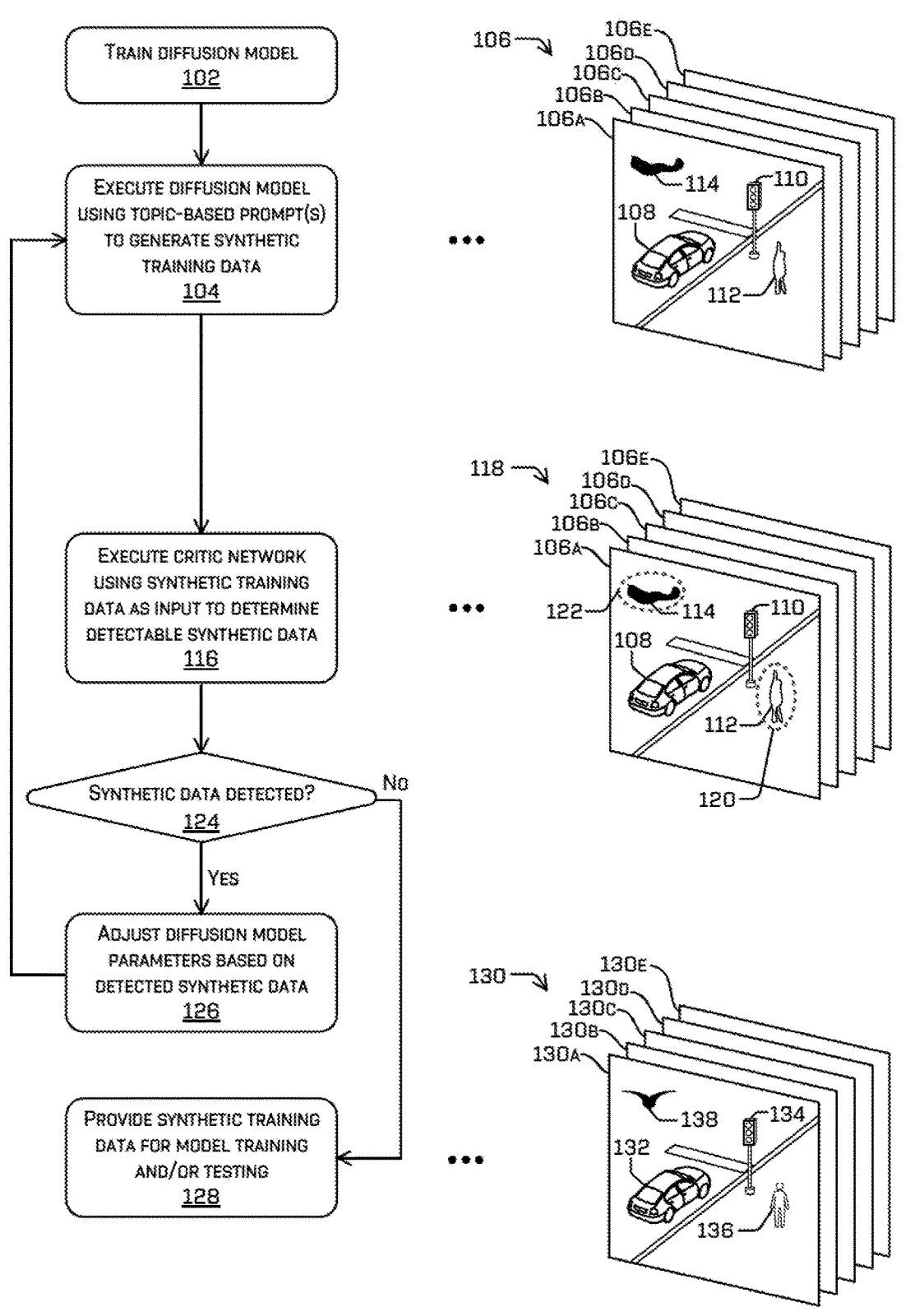
FIG. 1 is a pictorial flow diagram of an example process for iteratively refining a machine-learned model to generate synthetic training data, in accordance with examples of the disclosure.

Techniques for generating datasets that include perception data and that may be used to train or test models to perform detections of various types (e.g., object detections, classifications, etc.) and other functions are discussed herein. Such models may be executed by, or on behalf, of a vehicle computing system to control a vehicle operating within an environment. For example, a model training system may train a machine-learned model to detect objects in an environment based on perception data associated with the environment, such as images, lidar data, radar data, and so forth that may be generated by sensors configured at a vehicle. The output of such a model may include data that may be used by a vehicle computing system to determine a location, boundaries, classifications, labels, and/or other properties of one or more objects in the environment. For example, object position data such as location, yaw, center, boundaries, object type, etc. may be represented in and/or determined based on model output. Alternatively or additionally, object motion data such as velocity, acceleration, direction, etc. may be represented in and/or determined based on model output.

A vehicle may be configured with one or more sensors, such as image sensors (e.g., cameras), lidar sensors, radar sensors, sonar sensors, audio sensors, etc. that may capture sensor data representing an environment. In various examples, a vehicle may use this sensor data to determine objects in the environment and their associated characteristics. In some examples, data associated with multiple types of sensors may be used in object detection and/or the generation of data upon which object detection may be based. One or more machine-learned models may be executed using such sensor data (and/or data based on such sensor data) to generate object data as output. The vehicle may then use this object data as an input to one or more systems that may be configured to control the vehicle as it travels through an environment. However, sensor data may represent, or otherwise be associated with, unusual circumstances and scenarios (e.g., unusual objects, relatively rare scenarios (e.g., combinations of objects and environment aspects)) detected in the real-world that may not be commonly represented in training data that may have been used to train such one or more machine-learned models.

Due to the rarity of occurrence of unusual circumstances and scenarios, it may be difficult to obtain real-world training data that adequately represents such unusual circumstances and scenarios. To address this, a diffusion model may be used to generate synthetic training data in an effort to more thoroughly represent unusual circumstances and scenarios in training data. However, a diffusion model may not generate accurate and realistic representations of unusual circumstances and scenarios because such a model may also be trained using real-world based training data. For example, there may be too few examples of a particular unusual scenario or object in training data used to train a diffusion model to accurately train the model to output realistic training data representing the unusual scenario or object. A vehicle computing system configured at a vehicle that encounters unusual real-world scenarios may be configured with one or more models that have not been thoroughly trained for such scenarios. These models may generate incomplete and/or inaccurate output data (e.g., object data), rendering such data less helpful in controlling the vehicle. To address these challenges, as described herein, a critic network may be configured in a synthetic training data generation system to evaluate the synthetic training data output of a diffusion model and generate realism determination data that may be used to refine the diffusion model.

For example, objects and/or scenarios that are not commonly encountered in the real-world may be underrepresented in training data based solely on real-world data. Therefore, the use of exclusively real-world-based training data may undertrain a model to detect unusual scenarios and/or objects. Despite the rarity of such scenarios and objects, it may be important to ensure that models are trained to generate accurate and consistent output when such scenarios and objects are encountered. For instance, a person lying on the ground in a roadway may be an unusual scenario for a vehicle to encounter, but it may be very important to properly detect and process such a situation if encountered. More typical scenarios and objects may also become more difficult for a model to accurately process when they occur in less common circumstances, such as when objects in the environment are partially obscured or occluded from a sensor (e.g., by fog, rain, foliage, trash, smoke, etc.). Because examples of objects and environments subject to various unusual circumstances that may inhibit accurate detection may be rare and/or difficult to recreate, it may be challenging to train a machine-learned model to detect objects under such circumstances and process data based on such environments.

For example, diffusion models and/or other models may not have sufficient examples for training data for specific objects to accurately generate examples of such objects. This may be compounded by the fact that different sensor modalities, versions of sensors, etc. may be used and therefore sensor data corresponding to certain objects may not be consistent across captures of the examples of the object. For example, a rare object may be captured only via radar if it is outside the range of a camera or lidar system. Or, an object far away may be captured very minimally by a lower resolution camera or a camera without a sufficient telephoto lens.

In various examples, a system may train a machine-learned model to automatically, more accurately, and more efficiently detect objects and features in data collected in an environment, including objects in unusual circumstances that may typically inhibit accurate detection. The system may generate training data using a synthetic training data generation model. This generated synthetic training data may include synthetic data based on real-word scenarios and/or objects. The generated synthetic training data may take one or more forms, including synthetic sensor data (e.g., images, lidar data, radar data, sonar data, audio data, etc.) and synthetic object detection data (e.g., one or more data structures representing object detection data, such as object labels, attributes, properties, location, type, velocity, yaw, position, acceleration, etc.). The system may then process such generated synthetic training data using a critic network to determine if the critic network is able to identify the synthetic data as synthetic. For example, the critic network may evaluate the synthetic data associated with a particular scenario against real-world data associated with the same or a similar scenario to determine if the synthetic data is distinguishable from real-world data.

If the synthetic data is distinguishable from the real-world data, the system may feed back (e.g., backpropagate), to the synthetic training data generation model, a loss generated by, or otherwise determined based on the output of, the critic network. Such loss may be represented as one or more divergence values. For example, the critic network output may include or may be used to determine, as loss, one or more of a Jensen-Shannon divergence, a Wasserstein deterrence, a least squares divergence, or any other type of divergence and/or form of loss representative. Alternatively or additionally, if the synthetic data is distinguishable from the real-world data, the system may modify one or more parameters (e.g., condition data) of the synthetic training data generation model. The system may again execute the synthetic training data generation model based on the adjusted one or more parameters to generate a subsequent set of synthetic training data that may be critiqued by the critic network to determine whether any further adjustments to the synthetic training data generation model may be implemented. The system may iteratively execute this process until the synthetic training data generated by the synthetic training data generation model is substantially indistinguishable, by the critic network, from real-world data.

By using data generated by a critic network, such as loss, to refine a synthetic training data generation model, the critic network facilitates the generation of more realistic synthetic data by such a model. For instance, a loss for synthetic data determined by a critic network may represent a divergence from reality of that synthetic data. By backpropagating this loss to the synthetic training data generation model that generated the synthetic data, the critic network helps improve the ability of the model to generate realistic data. The critic network may be integrated into systems to help guide synthetic data generation models of any type and/or modality. For example, the disclosed systems and techniques may be used with synthetic data generation systems to refine models that may be configured to generate synthetic images, lidar data, radar data, depth data, depth image data, audio data, and/or any other modality of data.

In examples, a model training system may determine, acquire, or otherwise receive a set of real-world data representing one or more environments. For instance, the system may determine a set of images (e.g., two-dimensional images represented by frames or other data structures that may include pixels and/or pixel data representing color information (e.g., red, green, blue (RGB) values and/or depth values) representing scenes in a particular real-world environment, such as a particular city. These real-world images may have been captured by sensors (e.g., cameras) configured at one or more vehicles that traversed the environment.

The system may process this set of real-world images using a captioning component to determine one or more topics for the individual images in the set of real-world images. The captioning component may include an automatic captioning model or network (e.g., convolutional neural network (CNN), a graph neural network (GNN), etc.) trained to generate one or more natural language descriptions (topics) describing the scene represented in an individual image. The captioning component may also, or instead, identify and/or label objects and/or other aspects represented in an image or other modality of data unit. The captioning component may also, or instead, include a classifier that may determine one or more classifications for an image or other modality of data unit (e.g., from among a predetermined set of classifications). For instance, the captioning component may determine topics such as "person lying in the roadway," "raccoon crossing foggy street," "duck standing on sidewalk," etc. describing the scene captured in an image. The captioning component may also, or instead, parameterize objects represented in an image by augmenting image data with object data, such as location, type, velocity, yaw, position, acceleration, etc. The system may determine multiple topics for an individual image. For example, a "foggy roadway" topic image may also be a "pedestrian crossing the street in fog" topic image and a "motorcycle approaching in fog" topic image. In examples, images may also, or instead, be manually captioned, where one or more users may examine the individual images and determine the one or more applicable topics for such images.

The system may cluster the images in the set of real-world images based on their associated classifications, captions, and/or topics using a clustering component. The clustering component may evaluate and associate the images having the same or similar classifications, topics, and/or captions into clusters such that individual clusters of such images include images associated with a particular classification, topic, and/or caption. Because an individual image in the set of real-world images may be associated with multiple classifications/topics/captions, an individual image may also be associated with multiple clusters. In examples, the clustering component may execute a clustering model, network, or algorithm to automatically cluster a set of real-world images based on topics into clusters associated with individual topics.

The system may embed or otherwise associate topic and/or cluster data with the individual images in the set of real-world images. For example, image data for a particular image may be augmented with the one or more particular topics associated with the image and/or one or more identifiers of such topic data. Image data for a particular image may also, or instead, be augmented with the one or more particular clusters with which the image may be associated and/or one or more identifiers of such cluster data.

Using the topic and/or cluster data, the model training system may execute a synthetic training data generation model to generate a set of synthetic images. In examples, the synthetic training data generation model may include a diffusion model (e.g., a stable diffusion model or other form of generative text-image model). The system may provide one or more of the topics associated with the set of real-world images as one or more corresponding prompts to the synthetic training data generation model. Alternatively or additionally, the system may determine and/or generate prompts based on topics and/or other data associated with the set of real-world images, as described in more detail herein. In examples, the system may determine and/or generate prompts that include or otherwise represent model input associated with a particular modality. For instance, the prompts may specify or indicate to the synthetic training data generation model that image data, radar, data, lidar data, multimodal data, etc. is to be generated as synthetic data output. The synthetic training data generation model may generate and output a set of synthetic images based on such prompts. The synthetic training data generation model may embed, with the synthetic image data, the associated prompts (e.g., topics, topic-based prompts, etc.).

The system may provide the set of synthetic images (including any embeddings) and the set of real-world images (including any embeddings) to a critic network (may be referred to as a "critic") as input. The critic may be a generative adversarial network (GAN) and/or any other form of discriminatory network configured to evaluate the optimality (e.g., in regard to real-world representativeness) of images and/or other types of data. The system may execute the critic network to generate synthetic data detection information indicating images that are determined to be synthetic. For example, the critic network may perform one or more operations based on comparisons of images from the set of synthetic images associated with a particular topic to images of the set of real-world images associated with the same or a substantially similar topic.

The determined synthetic data detection information may be used to adjust the synthetic training data generation model. For example, the synthetic data detection information may include particular topics and/or other parameters associated with images determined by the critic network to be synthetic. This information may be backpropagated to the synthetic training data generation model (e.g., to one or more components therein, as described in more detail below) and/or otherwise used to determine one or more modifications to the synthetic training data generation model (e.g., one or more model parameter adjustments and/or one or more model component conditioning parameters). For example, the system may backpropagate loss (e.g., one or more divergence values) generated by, or otherwise determined based on the output of, the critic network to the synthetic training data generation model.

In examples, the system may refine a synthetic training data generation model using the operations described herein to generate a set of synthetic training images or other type of synthetic training data for an environment generally. For instance, the system may use a set of real-world images for a particular city or other location in operations as described herein to generate a set of synthetic images associated with a variety of topics.

Alternatively, the model training system may be used to refine the data generation capabilities of a synthetic training data generation model with regard to a particular topic and/or based on other criteria, such as object type. For example, the system may determine (e.g., automatically and/or based on user input) that images generated by the synthetic training data generation model that include an object of a particular type often include a distorted representation of the object. The system may generate a set of synthetic images including that type of object and provide them to the critic network that may critique these images (e.g., based on real-world images available to the critic network that also include objects of this particular type) and determine one or more adjustments that may be performed at the synthetic training data generation model to improve its generation of synthetic data that includes representations of objects of that particular type.

The system may iteratively execute one or more of the disclosed synthetic data generation, critiquing, and model refinement operations until the critic network determines or otherwise indicates in synthetic data detection information that the images or other training data generated by the synthetic training data generation model are substantially indistinguishable from real-world images or other real-world training data. In examples, the system may determine to terminate the iterative synthetic training data generation model refinement process based on the (e.g., null or empty) results of the synthetic data detection information generated by the critic network. Alternatively or additionally, the critic network may be configured to explicitly indicate (e.g., in synthetic data detection information) a termination of the refinement process.

Once the refinement process is complete, the synthetic training data generation model may be executed to generate a set of synthetic training data for use in training or testing one or more models that may be configured for execution at or on behalf of a vehicle computing system. For example, the synthetic training data generation model may be executed to generate a set of synthetic training data that may then be used to train an object detection model that may be configured as a component of a perception system configured at a vehicle computing system. Alternatively or additionally, a refined synthetic training data generation model may be used to generate training data for training various other types of components and/or systems (e.g., that may include one or more models and/or networks of any type), including segmentation components, detection components, and/or components that may be configured and/or trained to perform any of a variety of tasks and operations, including two-dimensional and/or three dimensional tasks, multimodal and/or fusion operations, top-down segmentation, planning operations, prediction operations, perception operations (e.g. lidar, radar, sonar, vision, audio, time-of-flight, other sensor operations, etc.), and so forth.

Alternatively or additionally, the synthetic training data generation model may be executed to generate a set of synthetic testing data that may then be used to test one or more models. For example, generated synthetic testing data may be used to determine whether a model or network under testing can properly identify (e.g., label, classify, etc.) one or more objects or other aspects of an environment. For instance, the generated testing data may include embeddings that indicate object types. The system may then execute one or more models using such testing data as input (obscuring or otherwise without providing access to the testing dataset embeddings) to determine whether such models correctly label or otherwise identify the objects represented in the testing data.

In examples, data of various types (e.g., beyond images) may be used to refine a model that may be configured to generate training data. For example, one or more models may be configured at a vehicle computing system as part of one or more perception components that may interact with individual sensors of a variety of types (e.g., lidar, sonar, radar, vision, audio, time of flight, etc.). Such models may be trained using training data generated by a refined synthetic training data generation model as described herein. For instance, real-world lidar data for a particular environment may be used by an exemplary model training system to refine a synthetic lidar training data generation model. The refined synthetic lidar training data generation model may then be used to generate training data that may be used to train a lidar-based object detection model that may be configured as a perception component at a vehicle computing system. In various examples, a machine-learned model trained as described herein may be executed by one or more of various components that may be configured in an autonomous vehicle, including perception components and/or individual sensors (e.g., lidar, sonar, radar, vision, audio, time of flight, etc.), and/or one or more associated components. Such a model may be used to determine data that may be combined with or otherwise used in conjunction with other data (e.g., map data) to determine a location of a vehicle, a vehicle trajectory, a vehicle route, one or more vehicle controls, and/or any other data that may include or make use of object detection data.

In examples, combinations of types of data may be used to further refine a synthetic training data generation model. For example, real-world training data may be determined that includes paired lidar and image data. The lidar data may include depth information that may be paired to corresponding pixels of the image data. This information may be used to refine the synthetic training data generation model to generate realistic image training data that includes depth information (e.g., RGBD images).

Various techniques may be used to further refine particular aspects of a synthetic training data generation model and/or the training data generated thereby. For example, one or more masks may be used as input and/or a model parameter to a synthetic training data generation model to determine a location of an object of interest. For instance, if the system is attempting to refine the synthetic training data generation model's generation of prone pedestrians, an object mask may be used to determine the location of such pedestrians within individual images. This may help improve the realistic placement of such objects (e.g., placing pedestrians on sidewalks or crosswalks rather than in rooftops or awnings), for example, where objects are augmented to real-world images or other data representing existing portions of an environment. Alternatively or additionally, individual pixels of an image (or other data element corresponding to a training data unit structure (e.g., voxel)) may be labeled with an identifier of a particular object type that may be used to perform model refinement and parameter adjustments as described herein. A mask may further be used in such examples to ensure that such pixels are realistically located within an image or other data unit, for example when such images or data units are augmented with object pixels.

As described herein, models may be representative of machine-learned models, statistical models, heuristic models, or a combination thereof. That is, a model may refer to a machine learning model that learns from a training data set to improve the accuracy of an output (e.g., an object detection, object classification, object prediction, etc.). Additionally or alternatively, a model may refer to a statistical model that is representative of logic and/or mathematical functions that generate approximations that may be usable to make such determinations and/or predictions.

The systems and techniques described herein may be directed to leveraging machine-learned models, sensor data, and associated data to improve object detection operations performed by a vehicle, such as an autonomous vehicle, in an environment. More specifically, the disclosed systems and techniques may be directed to facilitating more accurate detection of objects and determinations of object data and reducing the processing of data that does not contribute to object detection operations. Using this improved data, such a vehicle may generate safer and more efficient trajectories for use in navigating through an environment. In particular examples, the systems and techniques described herein can utilize synthetic training data, sensor data, and/or training datasets based on sensor data to train machine-learned models to more accurately and efficiently detect objects in an environment for use in determining vehicle control data. The examples described herein may result in increased certainty and accuracy in object detection operations, thereby allowing an autonomous vehicle to generate more accurate and/or safer trajectories for the autonomous vehicle to traverse in the environment.

For example, techniques described herein may increase the reliability of performing object detection in an environment, reducing the likelihood of inaccurately identifying or classifying an object or of failing to detect an object. That is, the techniques described herein provide a technological improvement over existing object detection and vehicle tracking and/or navigation technology. In addition to improving the accuracy of object detections, the systems and techniques described herein can provide a smoother ride and improve safety outcomes by, for example, more accurately providing safe passage to an intended destination through an environment using more accurate object data. Moreover, the systems and techniques may prevent unnecessary braking or hard-braking to avoid objects that could otherwise have been smoothly avoided if more accurate object data were available.

The techniques discussed herein can also improve a functioning of a computing system in a number of additional ways. In some cases, one or more models can determine properties, attributes, and/or state information for the object, and/or a scene for simulation using fewer computational resources than previous models. In some examples, one or more models can generate training data that is not included in the input data to the model(s) (e.g., generate a realistic scene from data other than scene data), and use the training data for training and/or validation of a vehicle controller associated with an autonomous vehicle. For example, refining a synthetic training data generation model as described herein can cause the model to generate training data using fewer processing and/or memory resources (relative to not refining the synthetic training data generation model), which may simplify the generation of training data for many models that may be configured across a variety of vehicles and platforms. In some cases, an output by a model may be evaluated using the disclosed systems and techniques to generate synthetic data detection information that may allow an autonomous vehicle to generate more accurate and/or safer trajectories for the autonomous vehicle to traverse an environment. For instance, a model configured at a computing system of an operational vehicle may be evaluated and refined while operating in a real-world environment, thus improving the safety and accuracy of operating such a vehicle. These and other improvements to the functioning of the computing device are discussed herein.

In some examples, the determination techniques discussed herein may reduce training time by training in parallel (e.g., using training data generated by models refined as described herein) and/or improve accuracy by reducing an amount of data to be stored. Further, such techniques provide for training networks based on larger datasets than would otherwise not be enabled due to, for example, limitations of memory, processing power, etc. (thereby creating more robust learned networks in shorter amounts of time).

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities for which object detection data is obtained or desired and/or in which machine-learned models are used. Further, although discussed in the context of particular types of data and detection using particular types of sensors, any suitable types of sensors and emitters are contemplated, as well as other types of sensor data (e.g., cameras, lidar, sonar, radar, audio, ultrasonic, time of flight, infrared, etc.). Furthermore, the disclosed systems and techniques may include using various types of components and various types of data and data structures, including, but not limited to, various types of image data and/or other sensor data (e.g., stereo cameras, time-of-flight data, radar data, sonar data, audio data, lidar data, and the like). For example, the techniques may be applied to any such sensor systems. Additionally, the techniques described herein can be used with real data (e.g., captured using sensor(s)), simulated data (e.g., generated by a simulator), or any combination of the two.

Figure 3:
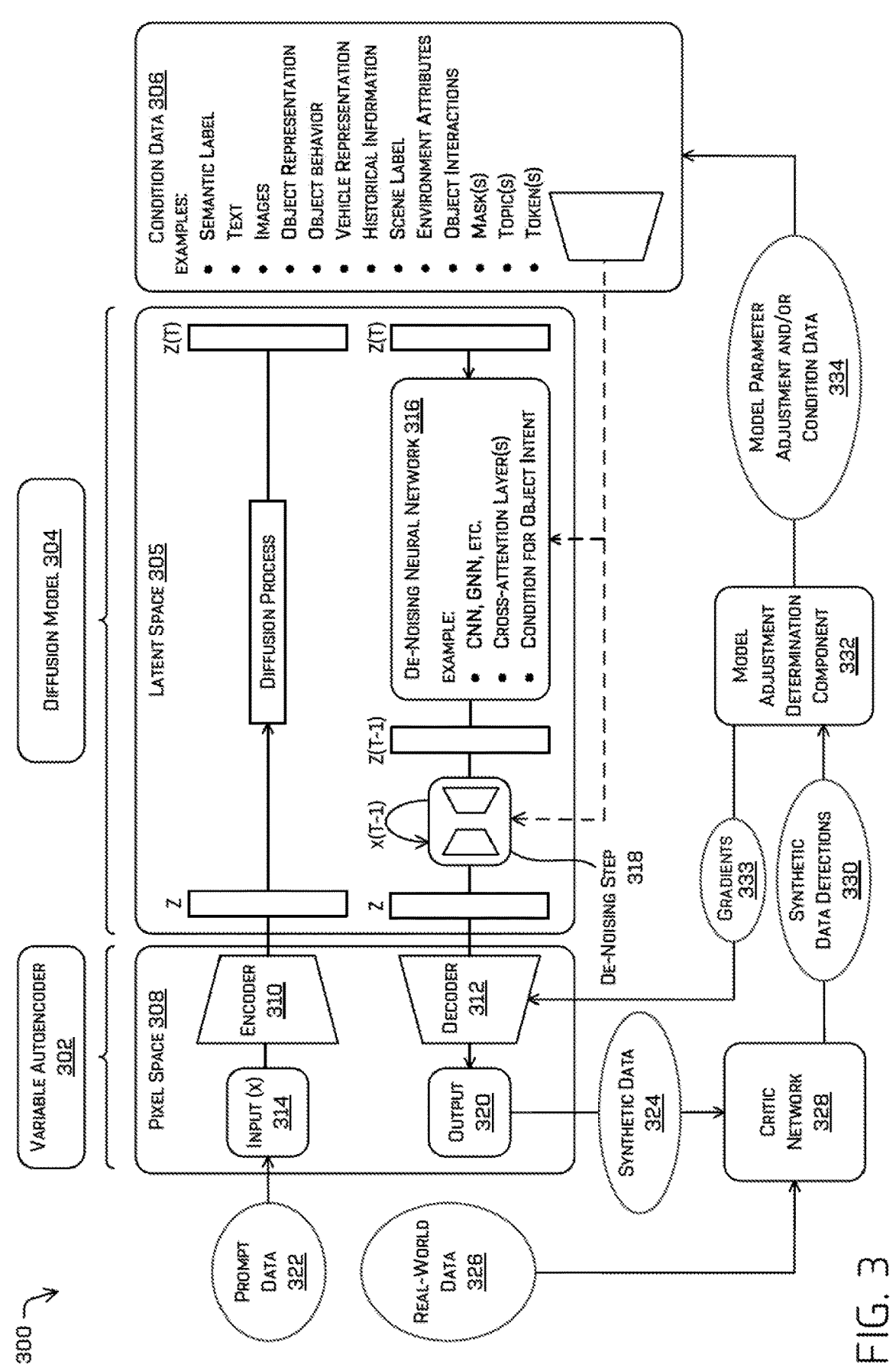
FIG. 3 is a block diagram of a model training system for iteratively refining the performance of a synthetic training data generation model, in accordance with examples of the disclosure.
Figure 4:
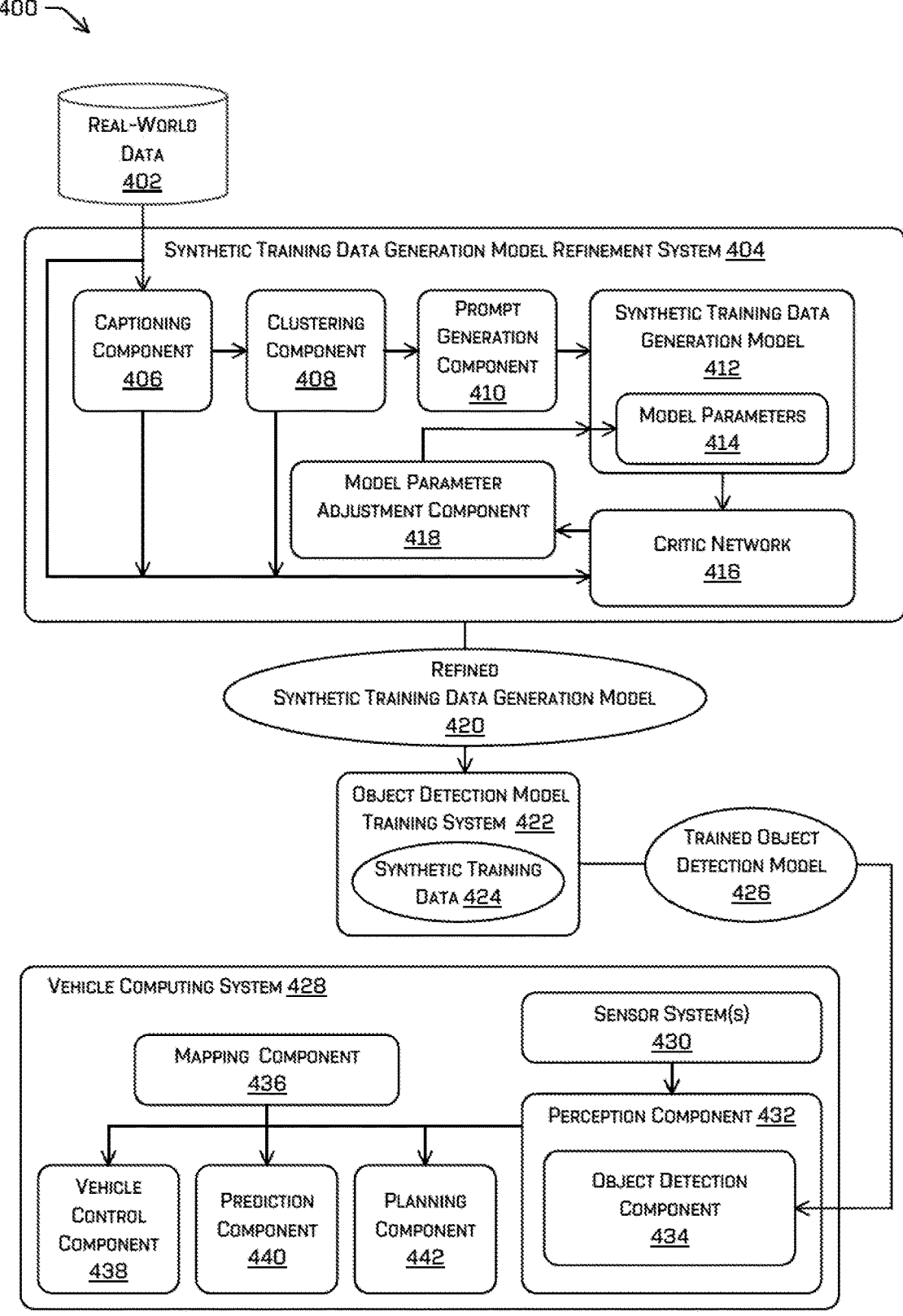
FIG. 4 is a block diagram of a model training system, in accordance with examples of the disclosure.
Figure 5:
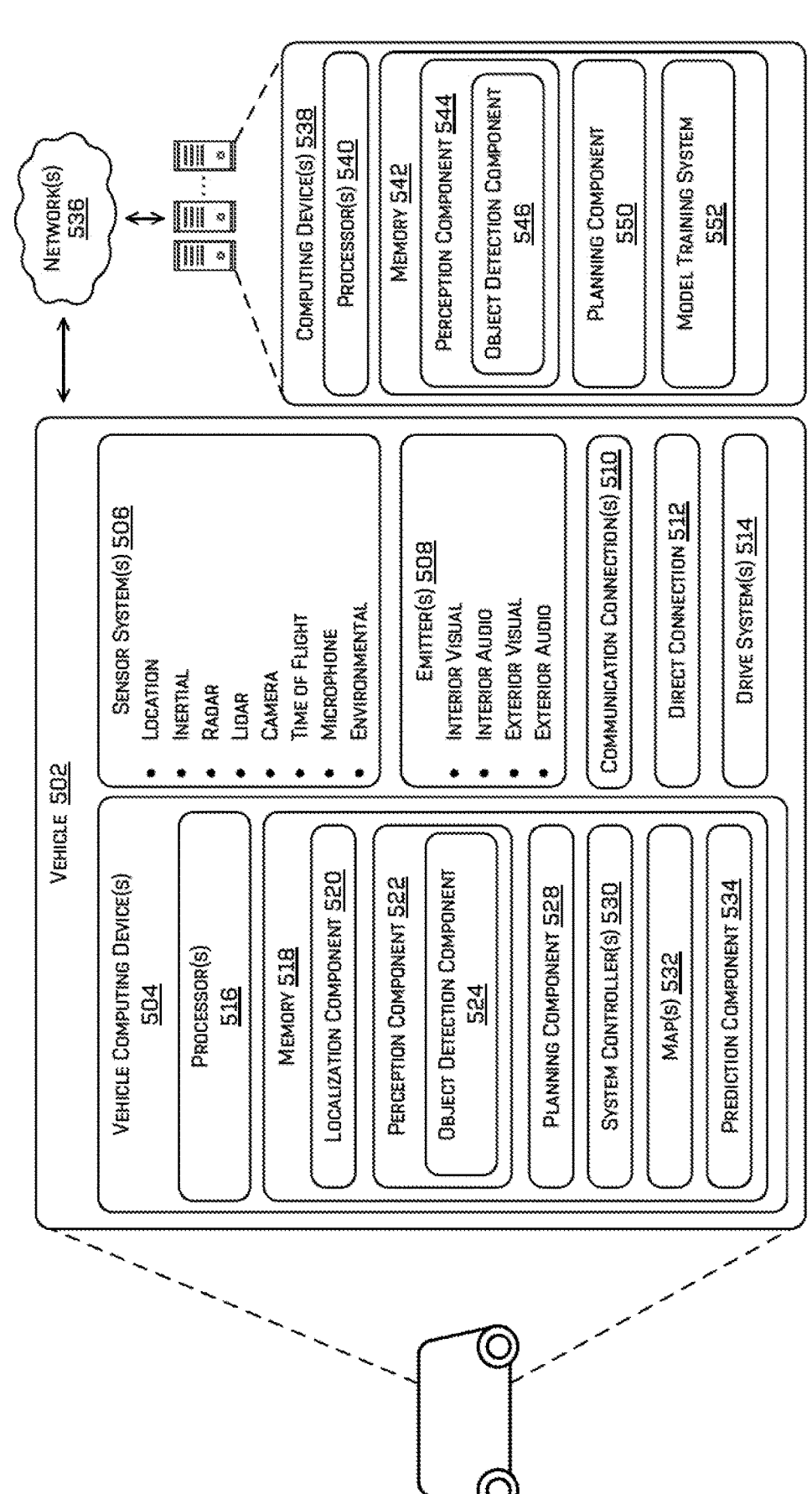
FIG. 5 is a block diagram of an example system for implementing the techniques described herein.

FIG. 1 is a pictorial flow diagram of an example process 100 for training a machine-learned model to improve object detections performed at a vehicle that may be operating in an environment by executing a refined synthetic training data generation model to generate a training dataset and using this dataset to train the machine-learned model. In some examples, one or more operations of the process 100 may be implemented by a vehicle computing system and/or by a machine-learned model training system, such as by using one or more of the components and systems illustrated in FIGS. 3, 4, and 5, and described below. For example, one or more components and systems can include those associated with one or more of the one or more sensor systems 506, the perception component 522, and/or the planning component 528. In some examples, the one or more operations of the process 100 may also, or instead, be performed by system 404 of FIG. 4 and/or one or more components associated therewith. In some examples, the one or more operations of the process 100 may also, or instead, be performed by a remote system in communication with a vehicle, such as model training system 552, the perception component 544, and/or planning component 550 of the computing device(s) 538 illustrated in FIG. 5. In some examples, the one or more operations of the process 100 may also, or instead, be performed by any one or more of the components of system 300 illustrated in FIG. 3. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing system. However, the process 100 is not limited to being performed by such components and systems, and the components and systems of FIGS. 3, 4, and 5 are not limited to performing the process 100.

At operation 102, a synthetic training data generation model, such as a diffusion model, may be initially trained. This may include any type of training to facilitate the execution of the model to generate synthetic training data as output based on one or more prompts (e.g., natural language prompts, images, etc.) that may be received as input. The model may also, or instead, be initially configured with one or more parameters, weights, and/or other model configuration data that may be used in the generation of images and/or other training data based on one or more prompts.

At operation 104, the trained synthetic training data generation model may be executed using one or more prompts (e.g., based on one or more topics) to generate synthetic training data. In examples, one or a relatively limited number of prompts may be used to focus the refinement process on improving the model's generation of particular types of objects and/or other aspects of synthetic training data generation. For instance, the prompts may be limited to prompts that include a particular type of object of interest (e.g., "prone pedestrian," "raccoon," "fog," etc.). Alternatively, the prompts provided as input to the synthetic training data generation model at operation 104 may be generalized and/or multitudinous in order to generate a significant training dataset that represents a large area (e.g., a city, a route expected to be traveled, etc.). For example, such prompts may include (e.g., only) a general descriptor, such as a place name (e.g., "Chicago"), and/or a general descriptor combined with many different specific descriptors, such as a place name and a specific location and condition (e.g., "Michigan Avenue in Chicago at night").

In examples, the prompts generated for use as input to the model at operation 104 may be natural language descriptions of scenarios and/or objects. Such descriptions may be generated by the system based on topics and/or may be provided by a user. Alternatively or additionally, prompts may be generated by providing natural language descriptions of scenarios and/or objects to prompt generation component that may be configured to generate prompts that represent similar scenarios and/or objects. For example, a prompt generation component may include or interact with a large language model (LLM) that may be configured to receive natural language descriptions as input and generate alternative natural language descriptions (e.g., representing similar objects and/or scenarios) as output (e.g., output descriptions using synonyms and/or other language similar to the input description). This may facilitate the generation of a variety of prompts that thoroughly represent one or more scenarios and/or objects.

Natural language prompts may be determined or generated based on subsets of real-world data. For example, the system may determine one or more particular objects or situations represented in real-world data (e.g., uncommon objects or situations determined based on clustering and/or topics, as described in more detail herein) and then may automatically determine or generate natural language descriptions associated with such objects or situations as prompts for the synthetic training data generation model. In such examples, the determination of a quantity and types of prompts may be based on determining that a quantity of the one or more particular objects or situations represented in real-world data is less than a threshold quantity.

Alternatively or additionally, prompts may be images. For example, images extracted from, or generated based on, real-world data may be used as prompts. In examples, a subset of such images may be used as prompts. For instance, the system may determine one or more particular objects or situations represented in real-world data (e.g., uncommon objects or situations determined based on clustering and/or topics, as described in more detail herein) and then may automatically select images associated with such objects or situations as prompt images for the synthetic training data generation model. In such examples, the determination of a quantity and types of image prompts may be based on determining that a quantity of the one or more particular objects or situations represented in real-world image data is less than a threshold quantity.

In examples, one or more masks may also be provided as or with prompts. Such masks may be associated with a particular types of objects or situations that may be represented in an image. The synthetic training data generation model may then generate training data focusing on such particular types of objects or situations using the one or more masks. Prompts may take any other suitable form, including machine-readable data of any type and sensor-data (e.g., lidar data, sonar data, radar data, audio data, image data, etc.).

In examples, a distribution may be used to determine prompts. For example, the system may be configured to refine a synthetic training data generation model to generate training data with a desired distribution of objects and/or scenarios. The system may identify and compare the distribution of objects and/or scenarios represented in the real-world data (e.g., the distribution of captions, prompts, etc. associated with the real-world data) to the desired distribution to determine prompts for use as input to the synthetic training data generation model. In such examples, the system may emphasize prompts that are associated with scenarios and/or objects that are underrepresented in the real-world data compared to the desired distribution by generating more and varied prompts associated such scenarios and/or objects. The system may also, or instead, deemphasize prompts that are associated with scenarios and/or objects that are overrepresented in the real-world data compared to the desired distribution by generating fewer and less varied prompts associated such scenarios and/or objects.

The data generated at operation 104 may be of any type suitable for training a model (e.g., a diffusion model or any other type of model). For example, the synthetic training data generation model may be configured and/or prompted to generate images (e.g., RGB and/or pixel data), depth images (e.g., images with depth information, such as RGBD images, pixels data with RGB data, etc.), lidar point clouds, radar data, sonar data, audio data, etc. The data generated at operation 104 may include embedded data representing the prompt(s) used as input to generate the data, as well as other suitable data, such as data type, associated cluster (if applicable), a timestamp, etc.

An example synthetic dataset 106 may be generated at operation 104 by a synthetic training data generation model. The dataset 106 includes images 106a-e generated by a synthetic training data generation model. A first image 106a of the images 106 may include representations of objects in an environment, such as a vehicle 108, a traffic signal 110, a pedestrian 112, and a bird 114. In examples, the image 106a may include embeddings that indicate object types represented in the image (e.g., data associated with individual pixels representing such objects). For instance, the pixels representing the vehicle 108, the traffic signal 110, the pedestrian 112, and the bird 114 may have associated data indicating an object type, label, classification, etc. (in examples, along with RGB and/or RGBD data). As can be seen here, the pedestrian object 112 and the bird object 114 may be distorted (e.g., not realistically represented). This may be due to the synthetic training data generation model having insufficient training in generating images representing birds and/or pedestrians in environments such as that represented by image 106a.

At operation 116, the system may execute a critic network using the training dataset generated by the synthetic training data generation model at operation 104 as input. The system may further provide, as input to the critic network, a real-world dataset associated with a same or substantially similar environment and/or scenarios as indicated by the prompts provided to the synthetic training data generation model to generate the synthetic training data at operation 104. For example, where the prompts for the synthetic training data generation model were relatively specific (e.g., "prone pedestrian on Michigan Avenue in Chicago in the fog"), the real-world dataset may also be associated with a similarly specific topic. Alternatively, a more complete and/or varied real-world dataset may be provided to the critic network, which may in turn evaluate embeddings and/or other data associated with the real-world dataset to identify a subset of the real-world dataset that corresponds to the topic of the synthetic training data generated at operation 104. In other examples, both the real-world dataset and the synthetic training data generated at operation 104 may be relatively varied and voluminous. In such cases, the critic network may use embedded topic and/or cluster data to associate data units from the individual datasets for realism determinations.

Further at operation 116, the critic network may determine whether any of the units of data of the generated synthetic training data are likely synthetic. For example, the critic network may be trained to identify synthetic images from among a plurality of images provided as input. The critic network may use an available real-world dataset to facilitate this determination. The critic network may generate output data (e.g., synthetic data detection information) indicating the units of data within the generated synthetic training data (and/or the particular distorted object represented therein), if any, that may be determined to be synthetic data. Note that this process of detecting synthetic data within a dataset will further train the critic network, thereby improving its ability to identify synthetic data.

An example 118 illustrates the synthetic dataset 106 that was generated at operation 104 by the synthetic training data generation model. As noted above, the pedestrian object 112 and the bird object 114 represented in image 106a may be distorted, indicating that these objects were synthetically generated. The critic network may generate synthetic data detection information indicating that image 106a is likely synthetic and/or including data 120 and/or 122 indicating that objects 112 and/or 114, respectively, represent synthetic data.

At operation 124, the system may determine if (e.g., based on the synthetic data detection information generated at operation 116) the synthetic dataset generated at operation 104 includes detectable synthetic data. This determination may be based on a loss or divergence value generated by the critic network (e.g., compared to a threshold value). If there is no indication of detectable synthetic data (e.g., no loss or minimal loss), the system may determine that the synthetic training data generation model is sufficiently trained ("refined") to generate realistic synthetic data (e.g., for topics associated with the synthetic dataset generated at operation 104). Based on this determination, the process 100 may proceed to operation 128, where the synthetic dataset generated at operation 104 and/or one or more other datasets generated by the refined synthetic training data generation model may be used to train and/or test one or more models. For example, the system may use or provide a synthetic training dataset generated by the refined synthetic training data generation model to train one or more models that may serve as an object detection component in a vehicle computing system. The system may also, or instead, use or provide a synthetic training dataset generated by the refined synthetic training data generation model to test one or more models (e.g., for object detection accuracy).

If, at operation 124, the system determines that the synthetic dataset generated at operation 104 includes detectable synthetic data (e.g., based on the synthetic data detection information generated at operation 116), at operation 126, the system may generate data and/or instructions that may then be used to update one or more parameters, weights, and/or other model configuration data for the synthetic training data generation model. Such parameters may be specifically associated with the detected synthetic data (e.g., where such detected synthetic data is associated with particular object types, etc.). In examples, the loss output generated and/or determined by the critic network the system may be fed back (e.g., backpropagated) at operation 124 to the synthetic training data generation model. For example, the output of a loss function generated by, or otherwise determined based on the output of, the critic network may be propagated to an input of the synthetic training data generation model. In examples, the loss function may include a function that determines one or more of a Jensen-Shannon divergence, a Wasserstein deterrence, a least squares divergence, and/or any other type of divergence and/or form of loss representative. Any other types of synthetic data detection information may also, or instead, be backpropagated through the synthetic training data generation model and/or one or more components configured therein.

In examples, the loss from the critic can be used to steer the diffusion model via modifying tokens/prompts used to generate data via the diffusion model. Such prompts may be human readable or not be interpretable by a human. For example, the prompt/token may be improved to more definitively define aspects of generated images such as locations, color hues, proportions, shapes, etc. An LLM or similar models may be used to generate human-readable text prompts for steering the diffusion model according to the loss generated by the critic. In examples, the token/prompt may be an image, tensor, or other machine-readable construct. This technique may be used during inference possibly avoiding retraining of the diffusion model.

In examples, other determinations may be performed at operation 124 to determine whether to adjust the synthetic training data generation model and/or one or more components configured therein and/or whether to continue to iteratively perform the process 100 as described herein. In examples, a quality of performance of particular synthetic data generations may be evaluated. For instance, the quality of a particular type of object represented in synthetic data (e.g., realism, based on loss specific to the represented object, in some examples) may be evaluated. If the quality of the represented object is insufficient (e.g., loss above a threshold), then the process may move to operation 126 for model parameter adjustments and/or loss backpropagation, and then to operation 104 or iteratively perform one or more operations of the process.

In examples, based on a determination of insufficiently realistic synthetic data, the system may generate additional prompts and/or other input for a synthetic training data generation model to further refine the model's capabilities for generating that type of data. For example, if the quality of a particular type of object represented in synthetic data (e.g., realism, based on loss specific to the represented object, in some examples) is not acceptable (e.g., exceeds a threshold), the system may use this determination at operation 104 to generate additional and/or varied prompts related to particular type of object. For instance, the system may generate additional prompts using an LLM and/or perform other operations to increase a quantity of prompts associated with the particular type of object (e.g., as described herein). In other examples, the critic may increase a penalty associated with that type of object that may be fed back to the model to further refine its synthetic data generation capabilities with regard to the particular type of object. The process 100 may be iteratively performed in this manner until the quality of the representations of the particular type of object are sufficiently realistic.

In examples, an end task may be evaluated to determine whether further refinements of the synthetic training data generation model are to be performed. For example, in a vehicle operating in an environment, a trajectory may be generated and used by a planning component to operate the vehicle in an environment. In response to a detection of a low quality trajectory for a particular situation, the system may determine to generate additional training data focusing on aspects of that scenario. For instance, if the planning components determines a "failure" of some kind based on a trajectory that involves a particular situation and/or object(s), the system may increase a number of prompts associated with the particular situation and/or object(s) using the techniques described herein to generate synthetic training data. This training data may then be used to further train and refine one or more models that may be involved in generating trajectories.

The process 100 may then return to operation 104 to execute the synthetic training data generation model to generate another training dataset based on updated configurations and/or parameters implemented at operation 126. The process 100 may continue again through operations 116, 124, and 126 until, at operation 124, the synthetic training data generation model is producing sufficiently realistic training data.

An example synthetic dataset 130 may have been generated at operation 104 by the synthetic training data generation model. The dataset 130 includes images 130a-e generated by the synthetic training data generation model at operation 104. As can be seen here, the first image 130*a* of the images 130 may include representations of a vehicle 132, a traffic signal 134, a pedestrian 136, and a 138, each of which may have associated embeddings and/or other data (e.g., indicating object types represented in the image, labels, classifications, color and/or depth information, etc.). As can be seen here, while the environment of image 130*a* is similar to that of image 106*a* of the previous examples, the pedestrian object 136 and the bird object 138 are realistically represented in this image and undistorted. Thus, the model that generated the image 130*a* may be sufficiently refined and therefore used for generating datasets that may be used for training and/or testing other models.

Figure 2:
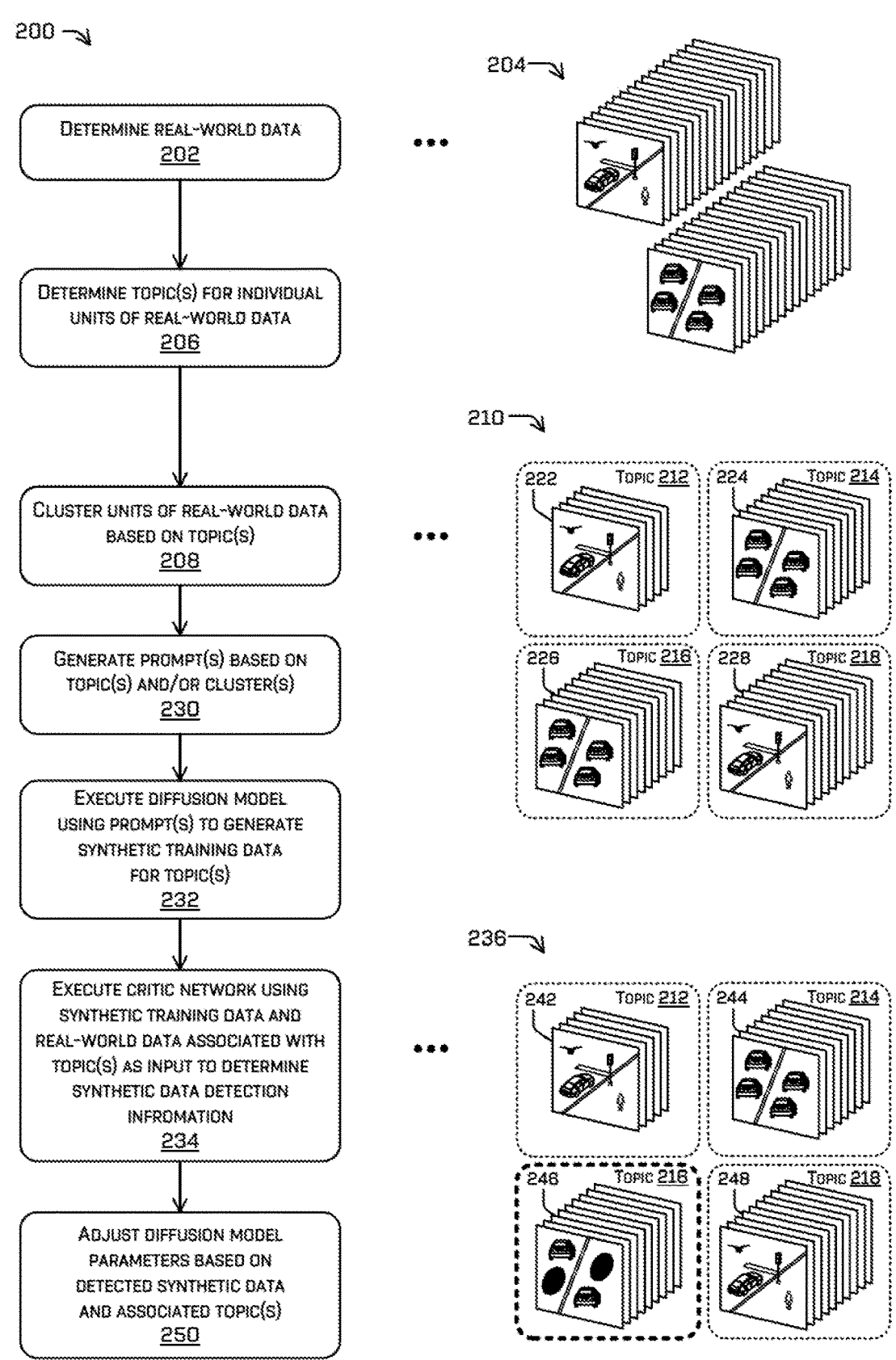
FIG. 2 is a pictorial flow diagram of an example process for refining a machine-learned model to generate synthetic training data, in accordance with examples of the disclosure.

FIG. 2 is a pictorial flow diagram of an example process 200 for training a machine-learned model to improve object detections performed at a vehicle that may be operating in an environment by executing a refined synthetic training data generation model to generate a training dataset and using this dataset to train the machine-learned model. In some examples, one or more operations of the process 200 may be implemented by a vehicle computing system and/or by a machine-learned model training system, such as by using one or more of the components and systems illustrated in FIGS. 3, 4, and 5, and described below. For example, one or more components and systems can include those associated with one or more of the one or more sensor systems 506, the perception component 522, and/or the planning component 528. In some examples, the one or more operations of the process 200 may also, or instead, be performed by system 404 of FIG. 4 and/or one or more components associated therewith. In some examples, the one or more operations of the process 200 may also, or instead, be performed by a remote system in communication with a vehicle, such as model training system 552, the perception component 544, and/or planning component 550 of the computing device(s) 538 illustrated in FIG. 5. In some examples, the one or more operations of the process 200 may also, or instead, be performed by any one or more of the components of system 300 illustrated in FIG. 3. Such processes may also, in turn, be performed by the device itself (e.g., using onboard electronics) such that a standalone device may produce such signals without the need for additional computational resources. In still other examples, the one or more operations of the process 200 may be performed by a combination of a remote system and a vehicle computing system. However, the process 200 is not limited to being performed by such components and systems, and the components and systems of FIGS. 3, 4, and 5 are not limited to performing the process 200.

At operation 202, a model training system may determine, acquire, or otherwise receive a real-world dataset representing one or more real-world environments. Any type of dataset may be determined at this operation. For instance, the system may determine a set of images (e.g., two-dimensional images represented by frames or other data structures that may include pixels and/or pixel data (e.g., RGB, RGBD, object type, location, boundaries, classifications, labels, and/or other properties of one or more objects associated with a corresponding pixel)) representing scenes in a particular real-world environment, such as a particular city. These real-world images may have been captured by sensors (e.g., cameras) configured at one or more vehicles that traversed the environment. Alternatively or additionally, radar data, lidar data, sonar data, audio data, time of flight, data, etc. may be determined as the data set in operation 202. An example real-world dataset 204 is illustrated in this figure that includes multiple images captured in an environment at various locations and representing a variety of scenes.

At operation 206, the system may process real-world datasets to determine one or more topics for the individual data units in the dataset. For example, the system may execute a captioning component using the real-world dataset as input to generate topics for the individual data units as output. The captioning component may include an automatic captioning model or network trained to generate one or more natural language descriptions describing the scene represented in an individual data unit and/or object represented therein as topics of the data unit. For instance, a captioning component may determine topics such as "prone pedestrian" and/or "Michigan Avenue in Chicago" as topics for a particular data unit. As described above, the system may determine multiple topics for an individual data unit in the real-world dataset. In examples, data units may also, or instead, be manually captioned. The determined topics for particular data units may be embedded with the data unit (e.g., the data unit may be augmented with such information). The determined topics may be embedded at the object level as well. For example, a pixel in an image may be augmented or otherwise associated with data indicating a classification or label for an object represented by the pixel (e.g., along with RGB or RGBD data).

At operation 208, the system may cluster the data units of the real-world dataset based on the determined topics. In examples, the system may execute a clustering component that may be a clustering model, network, or algorithm trained and/or configured to automatically evaluate and associate the data units with clusters such that individual clusters of such units include data units associated with a particular topic. As noted, individual data units may be associated with multiple topics, and therefore may also be associated with multiple clusters. Further at operation 208, the system may embed or otherwise associate cluster data with the individual data units in the set of real-world images.

An example 210 illustrates the images of the real-world dataset 204 of the previous example clustered into various clusters of images based on topic. As shown here, images 222 may be clustered and associated with topic 212, images 224 may be clustered and associated with topic 214 that may be distinct from topic 212, images 226 may be clustered and associated with topic 216 that may be distinct from both topic 212 and topic 214, and images 228 may be clustered and associated with topic 218 that may be distinct from topic 212, topic 214, and topic 216. Note that while the topics illustrated here are distinct, there may be the same images associated with multiple topics, as seen here where the first image of clustered images 222 is the same as the first image of clustered images 228, while the first image of clustered images 224 is the same as the first image of clustered images 226.

At operation 230, the system may use one or more of the topics or other data (e.g., object types, etc.) associated with the clustered data units of the real-world dataset determined at operation 208 to generate one or more corresponding prompts to the synthetic training data generation model. For example, a prompt generation component may determine natural language prompts based on the clusters and/or their associated topics (as determined at operations 206 and 208). For instance, the prompt generation component may use topic and/or cluster data as prompts and/or may generate prompts using such data by providing such data to an LLM to generate alternative natural language descriptions (e.g., representing similar objects and/or scenarios) as output (e.g., output descriptions using synonyms and/or other language similar to that associated with the topic and/or cluster data). This may facilitate the generation of a variety of prompts that thoroughly represent one or more scenarios and/or objects.

At operation 230, prompts may be determined or generated based on subsets of real-world data. For example, the system may determine one or more particular objects or situations represented in real-world data that have relatively fewer representatives in the real-world data, for instance, based on a number of data units included in a cluster associated with the particular objects or situations. A prompt generation component may automatically determine or generate prompts (e.g., natural language descriptions, prompt images, machine-readable prompts, etc.) associated with such particular objects or situations as prompts for the synthetic training data generation model. Further at operation 230, one or more masks may be determined for use in with the prompts to further focus the synthetic training data generation model on generating particular types of synthetic data (e.g., representing particular objects, scenarios, and/or situations). As described herein, a desired distribution of training data and a determined distribution of real-world data may also, or instead, be used to determine prompts (e.g., generating greater or fewer quantity and/or different types of prompts based on such distributions).

At operation 232, the system may use the prompt(s) determined at operation 230 to execute a synthetic training data generation model (e.g., a diffusion model) to generate a synthetic dataset. The synthetic training data generation model may generate and output a synthetic dataset based on such prompts. The synthetic training data generation model may embed, with the synthetic image data, the associated prompts (e.g., topics, object types, etc.).

At operation 234, the system may provide the synthetic dataset (including any embeddings) and the real-world dataset (including any embeddings) that served as the source for prompts provided to the synthetic training data generation model to a critic network as input. The system may execute the critic network to generate synthetic data detection information indicating data units of the synthetic dataset that are determined to be synthetic. For example, the critic network may perform one or more operations based on the data units of the synthetic dataset associated with a particular topic and the data units of the real-world dataset associated with the same or a substantially similar topic. For instance, the critic network may generate or determine a loss output generated and/or determined based on the based on the data units of the synthetic dataset and corresponding data units of the real-world dataset. Such output may include output of a loss function and/or a divergence function determined by the critic network based on the synthetic dataset (and, in some examples, the real-world dataset). One or more other forms of synthetic data detection information may also, or instead, be determined at operation 234.

Examples of a synthetic dataset 236 are illustrated in FIG. 2 that include clusters of data units associated with the same clusters of images based on topics as described in regard to the previous example. As shown here, synthetic images 242 may be clustered and associated with topic 212, synthetic images 244 may be clustered and associated with topic 214 that may be distinct from topic 212, synthetic images 246 may be clustered and associated with topic 216 that may be distinct from both topic 212 and topic 214, and synthetic images 248 may be clustered and associated with topic 218 that may be distinct from topic 212, topic 214, and topic 216. Here, the cluster of synthetic images 246 may include distortions, as shown in the first image of this cluster, and therefore the critic network may determine that these images and/or data indicating the distorted objects represented in these images should be indicated in synthetic data detection information.

At operation 250, the determined synthetic data detection information may be used to adjust the synthetic training data generation model. For example, the system may backpropagate the loss (e.g., one or more divergence values) generated by, or otherwise determined based on the output of, the critic network at operation 234. Alternatively or additionally, the synthetic data detection information may include particular topics and/or other parameters (e.g., object types, object classifications, etc.) associated with data units determined by the critic network to be synthetic. This information may be backpropagated to the synthetic training data generation model (e.g., to one or more components therein) and/or otherwise used to determine one or more modifications to the synthetic training data generation model (e.g., to modify one or more model parameter adjustments and/or to modify one or more model component conditioning parameters).

As noted, the system may iteratively refine a synthetic training data generation model using the operations described herein to generate a model that is capable of generating sufficiently realistic synthetic data for training and/or testing other models. Thus, as described herein, the process 200 may also repeat, returning to operation 230 following operation 250 until there is no synthetic data detection information and/or until such synthetic data detection information indicates that the synthetic training data generation model is generating sufficiently realistic data.

FIG. 3 illustrates an example block diagram 300 of an example model refinement system implemented by a computing system to refine a synthetic training data generation model, as described herein. The techniques described in the example 300 may be performed by a computing systems and/or components such as one or more components of the model training system 400, the vehicle computing device(s) 504, and/or the computing device(s) 538. In this example, the synthetic training data generation model may take the form of a diffusion model 304 and associated components, as described in more detail herein.

For example, the computing device can implement the diffusion model 304 of FIG. 3 to generate synthetic training data for use by a machine-learned model and/or model component such as the variable autoencoder 302. The diffusion model 304 may include latent space 305 for performing various steps (also referred to as operations) including adding noise to input data during training (shown as part of the "diffusion process" in FIG. 3) and/or removing noise from input data during non-training operations. The diffusion model 304 may receive condition data 306 for use during different diffusion steps to condition the input data, as discussed herein. For example, the condition data 306 can represent one or more of a semantic label, text, an image, an object representation, an object behavior, a vehicle representation, historical information associated with an object and/or the vehicle, an environment attribute, or an object interactions, among others. In various examples, the condition data 306 may include adjustments and/or modifications to the diffusion model 304 determined based on output from a critic network, such as critic network 328 shown in FIG. 3 (e.g., output of the critic network 328 backpropagated to the diffusion model 304).

In some examples, the condition data 306 may include a semantic label such as token information, node information, object type, object classification, and the like. The condition data 306 may include, for example, text or an image describing an object, a scene, and/or a vehicle. In some examples, the condition data 306 may be a representation and/or a behavior associated with one or more objects in an environment. The condition data 306 may also or instead represent environmental attributes such as weather conditions, traffic laws, time of day, or data describing an object such as whether another vehicle is using a blinker or a pedestrian is looking towards the autonomous vehicle. In some examples, the condition data 306 represents one or more control policies that control the generation of synthetic data (or objects represented therein). In a non-limiting example, the condition data 306 may include specifying an object behavior, such as a speed and direction.

FIG. 3 also depicts the variable autoencoder 302 associated with pixel space 308 that includes an encoder 310 and a decoder 312. In examples, the encoder 310 and the decoder 312 can represent recurrent neural network (RNN) or a multilayer perceptron (MLP). The encoder 310 may receive an input (x) 314 (e.g., an object type, object trajectory, map data, object state data, or other input data), and output embedded information Z in the latent space 305. In examples, the embedded information Z may include a feature vector for each object that may represent a trajectory, a pose, an attribute, a past trajectory, a type, etc. The input (x) 314 can represent a representation of an environment including a number of objects (e.g., that may be determined by the condition data 306). In some examples, the input (x) 314 may represent prompts provided to the diffusion model 304 (e.g., based on topics, clusters, etc. as described herein) that may be used to generate synthetic data as output.

During training, the "diffusion process" can include applying an algorithm to apply noise to the embedded information Z to output a noisy latent embedding Z (T). When implementing the diffusion model 304 after training, the noisy latent embedding Z (T) (e.g., a representation of the input (x) 314) may be input into a de-noising neural network 316. The diffusion model 304 may initialize the noisy latent embedding Z (T) with random noise, and the de-noising neural network 316 (e.g., a convolutional neural network (CNN), a graph neural network (GNN), etc.) may apply one or more algorithms to determine one or more object properties based on applying different noise for different passes, or steps, to generate latent variable data that represents an object in a synthetic image and/or other type of synthetic data. In some examples, multiple objects and object properties may be considered during denoising operations.

By way of example and not limitation, input to the de-noising neural network 316 may include a graph of nodes in which at least some nodes represent respective objects. In such examples, the input data can be generated with random features for each object, and the de-noising neural network 316 can include performing graph message passing operations for one or more diffusion steps. In this way, the de-noising neural network 316 may determine object properties (e.g., a position, a trajectory, an orientation, etc.) for an object with consideration to other objects. By performing multiple diffusion steps, potential interactions between objects may change over time to best reflect how a diverse set of objects may behave in a real-world environment.

The condition data 306 may be used by the diffusion model 304 in a variety of ways including being concatenated with the noisy latent embedding Z (T) as input into the de-noising neural network 316. In some examples, the condition data 306 may be input during a de-noising step 318 applied to an output of the de-noising neural network

316. The de-noising step 318 represents steps to apply the condition data 306 over time to generate the embedded information Z which can be output to the decoder 312 for use as initial states in a simulation that determines an output 320 representative of synthetic data and associated data, such as object properties.

A training component (not shown) can train the diffusion model 304 based at least in part on a computed loss for the decoder 312 (e.g., the ability of the decoder to produce an output that is similar to the input to the encoder). That is, the diffusion model can improve synthetic data generation over time based on being trained at least in part on a loss associated with the decoder 312. In some examples, the decoder 312 may be trained based at least in part on a loss associated with the diffusion model 304.

The diffusion model 304 may interact with a critic network 328 as described herein. The diffusion model 304 may receive, at input (x) 314, prompt data 322 that may consist of one or more prompts (in examples, determined based on real-world data, such as real-world data 326, as described herein). The diffusion model may process this input to generate synthetic data 324 via output 320, in examples, based on condition data 306 and various noising/denoising operations as described above. The critic network 328 may evaluate the synthetic data 324, in some examples based at least in part on real-world data 326 (e.g., using comparison of similar object types and/or other similar properties), to generate synthetic data detections 330 that may indicate whether (e.g., any of) the synthetic data 324 was detected as synthetic data. Such data may take any of variety of forms, including a binary indication of realism (e.g., "realistic" or "not realistic") and/or loss data, such as a loss generated by, or otherwise determined based on the output of, the critic network. In examples, this loss may be represented as one or more divergence values (e.g., a Jensen-Shannon divergence, a Wasserstein deterrence, a least squares divergence, etc.).

The synthetic data detections 330 may be provided to a model adjustment determination component 332 that may determine one or more adjustments of the diffusion model 304 that may be implemented to improve the realism of the synthetic data generated by the model. In examples, the model adjustment determination component 332 may feed back (e.g., backpropagate) gradients 333 that may have been included in the synthetic data detections 330 to the autoencoder 302 (e.g., to the decoder 312). In examples, gradients 333 may include one or more model parameter adjustments or other model adjustment data that may be computed based on loss and/or error estimations from the network output at 332. Additionally or alternatively, the model adjustment determination component 332 may generate one or more adjustments 334 to the condition data 306 based on the synthetic data detections 330. For example, the model adjustment determination component 332 may perform textual inversion to modify one or more parameters of the model (e.g., adding or updating one or more text tokens, adding or modifying one or more embeddings for one or more text tokens etc.). These updated condition data and parameters based on adjustment data 334 may be used to generate subsequent synthetic data that may then be further evaluated by the critic network 328. As noted, this iterative process may continue until the diffusion model 304 is capable of generating sufficiently realistic synthetic data.

FIG. 4 is a block diagram of a model training system 400 according to various examples. The system 400 may be implemented at a machine-learned model training system and/or at a vehicle (e.g., an autonomous vehicle) by a vehicle computing system. The system 400 may include one or more of the components and systems illustrated in FIGS. 3 and 5 and described herein. These components may be configured as described herein or in any other configuration and may perform any subset of their associated operations in any or and/or in conjunction with one or more other operations. For example, one or more components and systems can include and/or be implemented using processors 516 and/or 540 and/or memories 518 and/or 542. One or more of the components and systems of system 400 may also, or instead, include one or more of the components and models illustrated in FIG. 4 and described herein. In some examples, one or more operations performed by the system 400 may be implemented as a combination of components at a remote system and a vehicle computing system. However, the system 400 is not limited to being performed by such components and systems, and the components and systems of FIGS. 3 and 5 are not limited to implementing the system 400.

Real-world data 402 may be received and/or provided to a synthetic training data generation model refinement system 404. Real-world data 402 may represent sensor data collected or otherwise determined from a real-world environment. The data 402 may be based on unimodal or multimodal data and/or may be represented by one or more data structures of any type. For example, the real-world data 402 may include and/or represent images (e.g., represented as two-dimensional frames) based on camera data and/or multimodal sensor data (e.g., RGB data combined with depth data determined from lidar point clouds paired with images). The real-world data 402 may further include embeddings and/or other data augmented with sensor data, such as labels, classifications, etc. In various examples, the data 402 may originate at a vehicle, for example, generated by sensors capturing data in an environment as the vehicle travels within the environment. In various examples, the data 402 may be determined based on one or more multichannel data structures representing data associated with various types of sensors, such as image sensors (e.g., cameras), lidar sensors, radar sensors, audio sensors, sonar sensors, etc. that may capture sensor data representing an environment. The data 402 may include data associated with objects detected in an environment and/or one or more condition indications.

The synthetic training data generation model refinement system 404 may include a captioning component 406 that may be configured to determine one or more topics for the individual units of data in the real-world data 402 (e.g., for individual images or frames generated where the real-world data 402 is image data, for individual lidar point clouds where the real-world data 402 is lidar data, etc.). The captioning component 406 may include an automatic captioning model and/or network trained to generate one or more natural language descriptions (topics) describing the scene, objects, environment, etc. represented in an individual data unit of the real-world data 402. The captioning component 406 may determine multiple topics for a particular individual data unit. The captioning component 406 may embed or otherwise augment the data in the real-world data 402 representing such individual units of data with the determined topics for that data unit.

The captioning component 406 may provide the captioned real-world data 402 (e.g., data representing the determined topics and indications of associated real-world data units) to a clustering component 408. The clustering component 408 may evaluate and associate individual units of real-world data with clusters associated with a particular topic that is also associated with the individual units of real-world data. Individual units of data may be associated with multiple topics and multiple clusters. In examples, the clustering component 408 may execute a clustering model, network, or algorithm to automatically cluster a set of units of real-world data based on topics into clusters associated with individual topics. The clustering component 408 may embed or otherwise augment the data in the real-world data 402 representing such individual units of data with the determined clusters for that data unit.

The cluster and caption data may be provided to a prompt generation component 410 that may be configured to determine and/or generate prompts for a synthetic data generation model using cluster and/or caption data. For example, the prompt generation component may generate a prompt representing a topic associated with a particular cluster. Depending on the particular system configuration implemented, the prompt generation component may generate a single prompt or a limited number of prompts (e.g., to refine a synthetic training data generation model's capabilities for the associated particular topic(s)) or multiple prompts intended to represent a large variety of scenarios that may be encountered in a real-world environment (e.g., prompts associated with topics representing a wide variety of scenarios that may be encountered in a particular city or route).

In examples, the prompt generation component 410 may use one or more of the topics or other data (e.g., object types, etc.) associated with clustered data units determined by the clustering component 408 to generate one or more corresponding prompts for the synthetic training data generation model 412. For example, the prompt generation component 410 may determine natural language prompts based on the clusters and/or their associated topics. In some examples, the prompt generation component 410 may use such topic and/or cluster data as prompts and/or may generate prompts using such data by providing such data to an LLM to generate alternative natural language descriptions (e.g., representing similar objects and/or scenarios) as output (e.g., output descriptions using synonyms and/or other language similar to that associated with the topic and/or cluster data). This may facilitate the generation of a variety of prompts that thoroughly represent one or more scenarios and/or objects.

The prompt generation component 410 may also, or instead, generate prompts based on subsets of real-world data. For example, the system may determine one or more particular objects or situations that have a lower representation than desired in the real-world data (e.g. based on a desired distribution) and may automatically determine or generate prompts (e.g., natural language descriptions, prompt images, machine-readable prompts, etc.) associated with such particular objects or situations as prompts for the synthetic training data generation model 412. The prompt generation component 410 may also, or instead, generate and/or provide one or more masks to the synthetic training data generation model 412 that may be used to focus the model on generation of particular types of synthetic data (e.g., representing particular objects, scenarios, and/or situations).

A synthetic training data generation model 412 may be configured for refinement in the synthetic training data generation model refinement system 404. The synthetic training data generation model 412 may be executed using the prompts generated by the prompt generation component 410 as input to generate synthetic data as output. The synthetic training data generation model 412 may execute based on the model parameters 414. The generate synthetic data may be of any type (e.g., images, lidar data, radar data, etc.) and may include embeddings with additional information, such as the prompt(s) used to generate the synthetic data. In examples, the synthetic training data generation model 412 may be, or include, a diffusion model (e.g., a stable diffusion model or other form of generative text-image model) and one or more encoders. In a particular example, the synthetic training data generation model 412 may be the diffusion model 304 of FIG. 3 and the model parameters 414 may be the condition 306 of FIG. 3.

Synthetic data generated by the synthetic training data generation model 412 may be provided to the critic network 416 for evaluation. The critic network 416 may also receive the real-world data 402. In examples, the real-world data 402 received by the critic network 416 may include caption data and/or cluster data, and/or such data may be provided to the critic network by the captioning component 406 and/or the clustering component 408. The critic network 416 may be executed using the synthetic data generated by the synthetic training data generation model 412 and, in examples, the real-world data 402 (and/or associated data) as input to generate synthetic data detection information indicating whether (e.g., portions or subsets of) the synthetic data that may be synthetic. For example, the critic network may perform one or more operations using a subset of the real-world data 402 associated with a particular topic to determine if synthetic data associated with that particular topic is synthetic. The critic network 416 may be a GAN and/or any other form of discriminatory network configured to evaluate the optimality (e.g., in regard to real-world representativeness) of synthetic data of any type.

The critic network 416 may provide synthetic data detection information to a model parameter adjustment component 418. The synthetic data detection information may take any of variety of forms, including a binary indication of realism (e.g., "realistic" or "not realistic") and/or loss data, such as a loss generated by, or otherwise determined based on the output of, the critic network. In examples, this loss may be represented as one or more divergence values (e.g., a Jensen-Shannon divergence, a Wasserstein deterrence, a least squares divergence, etc.).

The model parameter adjustment component 414 may feed back (e.g., backpropagate) loss data that may have been generated by the critic network 416 and/or included in synthetic data detection information to the synthetic training data generation model 412 (e.g. to an autoencoder and/or decoder of the model). Additionally or alternatively, the model parameter adjustment component 418 may determine whether any adjustments to the model parameters 414 of the synthetic training data generation model 412 are warranted. For example, if at least a portion of the synthetic data generated by the synthetic training data generation model 412 is detected as synthetic by the critic network 416, the model parameter adjustment component 418 may determine one or more modifications (e.g., weight adjustments, model parameter adjustments, etc.) to be made to the model parameters 414. The model parameter adjustment component 418 may implement such adjustments at the synthetic training data generation model 412. The model parameter adjustment component 418 may also, or instead, perform textual inversion based on the output of the critic network 416 to determine one or more modifications of one or more parameters of the synthetic training data generation model 412, for instance, by adding and/or modifying one or more text tokens and/or associated embeddings.

The synthetic training data generation model refinement system 404 may then execute the synthetic training data generation model 412 again using the updated model parameters 414, in examples using the same prompts as before as input, to generate subsequent synthetic data for critiquing by the critic network 416. This process may be iteratively performed for one or more particular topics until the synthetic data generated by the synthetic training data generation model 412 for that topic is indistinguishable from real-world data by the critic network 416. At this point, the synthetic training data generation model 412 may be considered "refined" as to that particular topic. This process may be performed for multiple topics to generate a fully refined synthetic training data generation model 412.

A refined synthetic training data generation model 420 may be provided to an object detection model training system 422 that may execute the refined model to generate synthetic training data 424. The model training system 422 may use the synthetic training data 424 to train one or more object detection models, such as a trained object detection model 426. The trained object detection model 426 may be provided to a vehicle computing system, such as vehicle computing system 428, for use in controlling a vehicle operating in an environment.

For example, the object detection model training system 422 may provide the trained object detection model 426 to a perception component 432 of the vehicle computing system 428 for execution in or as part of an object detection component 434. The object detection component and/or the perception component may receive sensor data from one or more sensor systems 430 while the vehicle at which the vehicle computing system 428 is configured traverses an environment. The perception component 432 may provide object detection data (e.g., generated by the object detection component 434 executing the trained object detection model 426) to one or more of a planning component 442, a prediction component 440, and a vehicle control component 438 that may use such data to determine various vehicle control data and parameters. In examples, these components may determine the various vehicle control data and parameters further based on map data provided by a mapping component 436.

In examples, the vehicle computing system 428 may be deployed to an operational environment and may control a vehicle to autonomously traverse such an environment. While operating in an environment, the perception component 432 (e.g., the object detection component 434) may execute the trained object detection model 426 to detect and label objects in the environment based on data received from the vehicle's sensor system(s) 430. In this example, the labeled data generated or otherwise determined by the perception component 432 may be provided to other components of the vehicle computing system 428 for controlling the vehicle, such as one or more of the planning component 442, the prediction component 440, and the vehicle control component 438.

The trained object detection model 426 and one or more other detection systems and/or models may be integrated into a single machine-learned model executed by a CNN. Alternatively, such models and/or systems may include independently executed models, the outputs of which may be provided to one or more other models and/or other components to perform the operations described herein.

The trained object detection model 426 may also, or instead, be provided to one or more other systems or components to generate synthetic training data for training and/or testing one or more machine-learned models to, for example, detect and properly identify (e.g., label, classify, etc.) one or more objects in an environment.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, an object detection component 524, a planning component 528, one or more system controllers 530, one or more maps 532, and a prediction component 534. Though depicted in FIG. 5 as residing in memory 518 for illustrative purposes, it is contemplated that any one or more of the localization component 520, the perception component 522, the object detection component 524, the planning component 528, the one or more system controllers 530, the one or more maps 532, and the prediction component 534 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data.

In some instances, the perception component 522 can include functionality to perform object detection, segmentation, and/or classification, in addition to, or instead of, object auto-labeling and machine-learned model training operations. For example, the perception component 522 may include the object detection component 524 that may be trained according to the examples provided herein (e.g., using synthetic training data generated by a refined synthetic training data generation model as described herein) to provide improved object detection. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, unknown). In additional or alternative examples, the perception component 522 can provide processed sensor data that indicates one or more characteristics associated with a detected entity (e.g., a tracked object) and/or the environment in which the entity is positioned. The perception component 522 may use multichannel data structures to represent processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation, intensity, etc. Such entity characteristics may be represented in a data structure (e.g., a voxel data structure generated as output of one or more voxelization operations, a two-dimensional grid of cells containing data, etc.). Characteristics associated with the environment can include, but are not limited to, a presence of another entity in the environment, a state of another entity in the environment, a time of day, a day of a week, a season, a weather condition, an indication of darkness/light, etc.

In general, the planning component 528 can determine a path for the vehicle 502 to follow to traverse through an environment. In some examples, the planning component 528 can determine various routes and trajectories and various levels of detail. For example, the planning component 528 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, and/or the planning component 528 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year). Storing multiple maps 532 can have similar memory requirements but increase the speed at which data in a map can be accessed.

In general, the prediction component 534 can generate predicted trajectories of objects in an environment. For example, the prediction component 534 can generate one or more predicted trajectories for vehicles, pedestrians, animals, and the like within a threshold distance from the vehicle 502. In some instances, the prediction component 534 can measure a trace of an object and generate a trajectory for the object based on observed and predicted behavior. In some examples, the prediction component 534 can use data and/or data structures based on return pulses to generate one or more predicted trajectories for various mobile objects in an environment. In some examples, the prediction component 534 may be a sub-component of perception component 522 and/or may interact with, or otherwise process data generated by, the object detection component 524.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may include one or more convolution/deconvolution layers.

An example neural network is an algorithm that passes input data through a series of connected layers to produce an output. Individual layers in a neural network can also comprise another neural network or can comprise any number of layers, and such individual layers may be convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time of flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 536, to the one or more computing device(s) 538 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable road presence, and/or other data.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short-range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., data representing return pulses) to the computing device(s) 538. In some examples, the vehicle 502 may send sensor data to the computing device(s) 538 at a particular frequency, after a lapse of a predetermined period of time, in near real-time, etc. In some cases, the vehicle 502 may send sensor data (raw or processed) to the computing device(s) 538 as one or more log files.

The computing device(s) 538 can include processor(s) 540 and a memory 542 storing a planning component 550, a perception component 544, an object detection component 546, and/or a model training system 552 that may be configured to perform one or more of the operations described herein. In some instances, the perception component 544 can substantially correspond to the perception component 522 and can include substantially similar functionality. In some instances, the object detection component 546 can substantially correspond to the object detection component 524 and can include substantially similar functionality. In some instances, the planning component 550 can substantially correspond to the planning component 528 and can include substantially similar functionality. In some instances, the model training system 552 may perform one or more of the synthetic data generation model refinement operations described herein.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the techniques and operations described herein and the functions attributed to the various disclosed systems. In various implementations, the memory 518 and 542 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving real-world image data associated with an environment; determining, based at least in part on the real-world image data, a prompt associated with image data represented by a subset of the real-world image data; executing a diffusion model, using the prompt as first input, to generate first synthetic image data as first output; executing a discriminatory network, using the first synthetic image data as second input, to generate first loss data associated with the first synthetic image data; backpropagating the first loss data through the diffusion model to generate a modified diffusion model; executing the modified diffusion model, using the prompt as third input, to generate second synthetic image data as second output; executing the discriminatory network, using the second synthetic image data as fourth input, to generate second loss data associated with the second synthetic image data; and executing, based at least in part on the second loss data, the diffusion model to generate synthetic image training data to train one or more detection models.

B: The system of paragraph A, wherein determining the prompt comprises: determining one or more captions for images of the subset of the real-world image data; and determining the prompt based at least in part on the one or more captions.

C: The system of paragraph A or B, wherein: the subset of the real-world image data comprises a cluster of images of the real-world image data; and the operations further comprise: determining one or more captions for images of the real-world image data; clustering a subset of the images of the real-world image data associated with a caption of the one or more captions into the cluster of images; and determining the prompt based at least in part on the caption.

D: The system of any of paragraphs A-C, wherein determining the prompt comprises: determining a type of object represented in an image of the subset of the real-world image data; and determining the prompt based at least in part on the type of object.

E: The system of any one of paragraphs A-D, wherein the operations further comprise: iteratively executing the diffusion model to generate subsequent synthetic image data, executing the discriminatory network to generate subsequent synthetic data detection information; and modifying one or more parameters of the diffusion model based at least in part on the subsequent synthetic data detection information until the subsequent synthetic data detection information indicates that the subsequent synthetic image data is not synthetic.

F: One or more non-transitory computer-readable media storing instructions that, when executed by one or more processors, perform operations comprising: executing a diffusion model, using a prompt as first input, to generate first synthetic training data as first output; executing a critic, using the first synthetic training data as input, to generate loss data associated with the first synthetic training data as second output; backpropagating the loss data through the diffusion model to update output from the diffusion model; and executing the diffusion model based at least in part on the loss data to generate second synthetic training data as third output for training one or more detection models.

G: The one or more non-transitory computer-readable media of paragraph F, wherein the operations further comprise: determining a classification for one or more data units of real-world data; and determining the prompt based at last in part on the classification.

H: The one or more non-transitory computer-readable media of paragraph F or G, wherein the prompt comprises an indication of a modality.

I: The one or more non-transitory computer-readable media of any of paragraphs F-H, wherein the operations further comprise: using real-world image data and corresponding real-world lidar data to generate depth image data; and determining the prompt based at last in part on the depth image data.

J: The one or more non-transitory computer-readable media of any of paragraphs F-I, wherein: the loss data comprises an indication that the first synthetic training data is synthetic; and executing the diffusion model to generate the second synthetic training data as the third output comprises configuring an object mask at the diffusion model.

K: The one or more non-transitory computer-readable media of any of paragraphs F-J, wherein the operations further comprise determining the prompt based on a caption associated with a cluster of data units of real-world data.

L: The one or more non-transitory computer-readable media of any of paragraphs F-K, wherein the operations further comprise determining the prompt based on a type of object.

M: The one or more non-transitory computer-readable media of any of paragraphs F-L, wherein the operations further comprise: training an object detection model using the second synthetic training data; and providing the object detection model to a vehicle computing system for use in controlling a vehicle in an environment.

N: The one or more non-transitory computer-readable media of any of paragraphs F-M, wherein the prompt comprises one or more of: an image; lidar data; radar data; audio data; or machine-readable data.

O: A method comprising: executing a diffusion model, using a prompt as first input, to generate first synthetic data as first output; executing a critic, using the first synthetic data as input, to generate loss data associated with the first synthetic data as second output; backpropagating the loss data through the diffusion model to generate an updated diffusion model; and executing the updated diffusion model to generate second synthetic data as third output.

P: The method of paragraph O, wherein: executing the critic further generates synthetic data detection information; and the method further comprises modifying conditioning data of the diffusion model based at least in part on the synthetic data detection information.

Q: The method of paragraph P or Q, further comprising: determining one or more object labels for objects represented in real-world data; and determining the prompt based at least in part on the one or more object labels.

R: The method of paragraph Q, further comprising: captioning data units of real-world data; clustering the data units based at least in part on captions associated with the data units to determine clustered data units and associated cluster data; and determining the prompt based on the cluster data.

S: The method of any of paragraphs O-P, wherein backpropagating the loss data through the diffusion model comprises: determining that a loss value represented in the loss data meets or exceeds a loss threshold; and based at least on part on determining that the loss value meets or exceeds the loss threshold, backpropagating the loss data through the diffusion model to generate an updated diffusion model.

T: The method of any of paragraphs O-S, further comprising: determining a classification for one or more data units of real-world image data; determining that a quantity of the one or more data units is below a threshold quantity; and determining the prompt based at least in part on the classification.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving real-world image data associated with an environment;
determining, based at least in part on the real-world image data, a prompt associated with image data represented by a subset of the real-world image data;
executing a diffusion model, using the prompt as first input, to generate first synthetic image data as first output;
executing a discriminatory network, using the first synthetic image data as second input, to generate first loss data associated with the first synthetic image data;
backpropagating the first loss data through the diffusion model to generate a modified diffusion model;
executing the modified diffusion model, using the prompt as third input, to generate second synthetic image data as second output;
executing the discriminatory network, using the second synthetic image data as fourth input, to generate second loss data associated with the second synthetic image data; and
based at least in part on determining that a loss value of the second loss data falls below a threshold, executing, based at least in part on the second loss data, the modified diffusion model to generate synthetic image training data to train one or more detection models.

2. The system of claim 1, wherein determining the prompt comprises:
determining one or more captions for images of the subset of the real-world image data; and
determining the prompt based at least in part on the one or more captions.

3. The system of claim 1, wherein:
the subset of the real-world image data comprises a cluster of images of the real-world image data; and
the operations further comprise:
determining one or more captions for images of the real-world image data;
clustering a subset of the images of the real-world image data associated with a caption of the one or more captions into the cluster of images; and
determining the prompt based at least in part on the caption.

4. The system of claim 1, wherein determining the prompt comprises:
determining a type of object represented in an image of the subset of the real-world image data; and
determining the prompt based at least in part on the type of object.

5. The system of claim 1, wherein:
executing the modified diffusion model to generate the second synthetic image data as second output comprises:

iteratively executing the modified diffusion model to generate subsequent synthetic image data;

executing the discriminatory network to generate subsequent synthetic data detection information;

modifying one or more parameters of the modified diffusion model based at least in part on the subsequent synthetic data detection information; and executing the modified diffusion model comprising the one or more modified parameters to generate the second synthetic image data as second output.

6. One or more non-transitory computer-readable media storing instructions that, when executed by one or more processors, perform operations comprising:

executing a diffusion model, using a prompt as first input, to generate first synthetic training data as first output;

executing a critic, using the first synthetic training data as second input, to generate first loss data associated with the first synthetic training data as second output;

backpropagating the first loss data through the diffusion model to generate a modified diffusion model;

executing the modified diffusion model, using the prompt as third input, to generate second synthetic training data as third output;

executing the critic, using the second synthetic training data as fourth input, to generate second loss data associated with the second synthetic training data; and based at least in part on determining that a loss value of the second loss data falls below a threshold, executing the modified diffusion model based at least in part on the second loss data to generate third synthetic training data as fourth output for training one or more detection models.

7. The one or more non-transitory computer-readable media of claim 6, wherein the operations further comprise:

determining a classification for one or more data units of real-world data; and determining the prompt based at last in part on the classification.

8. The one or more non-transitory computer-readable media of claim 6, wherein the prompt comprises an indication of a modality.

9. The one or more non-transitory computer-readable media of claim 6, wherein the operations further comprise:

using real-world image data and corresponding real-world lidar data to generate depth image data; and determining the prompt based at last in part on the depth image data.

10. The one or more non-transitory computer-readable media of claim 6, wherein:

the first loss data comprises an indication that the first synthetic training data is synthetic; and executing the modified diffusion model to generate the second synthetic training data as the third output comprises configuring an object mask at the modified diffusion model.

11. The one or more non-transitory computer-readable media of claim 6, wherein the operations further comprise determining the prompt based on a caption associated with a cluster of data units of real-world data.

12. The one or more non-transitory computer-readable media of claim 6, wherein the operations further comprise determining the prompt based on a type of object.

13. The one or more non-transitory computer-readable media of claim 6, wherein the operations further comprise:

training an object detection model using the third synthetic training data; and providing the object detection model to a vehicle computing system for use in controlling a vehicle in an environment.

14. The one or more non-transitory computer-readable media of claim 6, wherein the prompt comprises one or more of:

an image;

lidar data;

radar data;

audio data; or machine-readable data.

15. A method comprising:

executing a diffusion model, using a prompt as first input, to generate first synthetic data as first output;

executing a critic, using the first synthetic data as second input, to generate first loss data associated with the first synthetic data as second output;

backpropagating the first loss data through the diffusion model to generate an updated diffusion model;

executing the updated diffusion model, using the prompt as third input, to generate second synthetic data as third output;

executing the critic, using the second synthetic data as fourth input, to generate second loss data associated with the second synthetic data; and based at least in part on determining that a loss value of the second loss data falls below a threshold, executing the updated diffusion model to generate third synthetic data as fourth output for training one or more detection models.

16. The method of claim 15, wherein:

executing the critic further generates synthetic data detection information; and the method further comprises modifying conditioning data of the diffusion model based at least in part on the synthetic data detection information.

17. The method of claim 15, further comprising:

determining one or more object labels for objects represented in real-world data; and determining the prompt based at least in part on the one or more object labels.

18. The method of claim 17, further comprising:

captioning data units of real-world data;

clustering the data units based at least in part on captions associated with the data units to determine clustered data units and associated cluster data; and determining the prompt based on the cluster data.

19. The method of claim 15, wherein backpropagating the first loss data through the diffusion model comprises:

determining that a second loss value represented in the first loss data meets or exceeds the threshold; and based at least on part on determining that the second loss value meets or exceeds the threshold, backpropagating the first loss data through the diffusion model to generate the updated diffusion model.

20. The method of claim 15, further comprising:

determining a classification for one or more data units of real-world image data;

determining that a quantity of the one or more data units is below a threshold quantity; and determining the prompt based at least in part on the classification.

* * * * *